April 16, 1968     J. T. MYERS     3,378,094
MOTOR VEHICLE
Filed Jan. 14, 1966     2 Sheets-Sheet 1
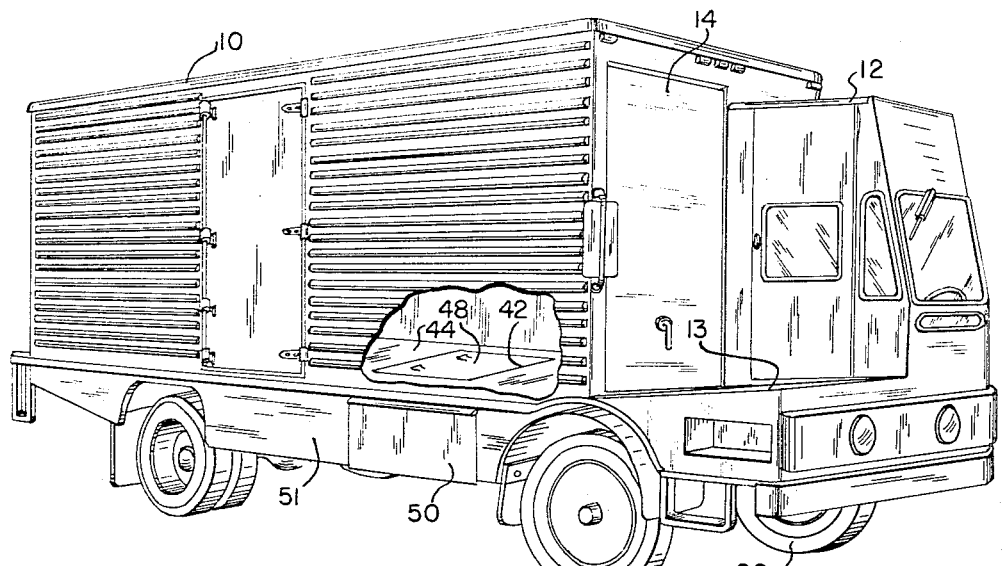
FIG. 1
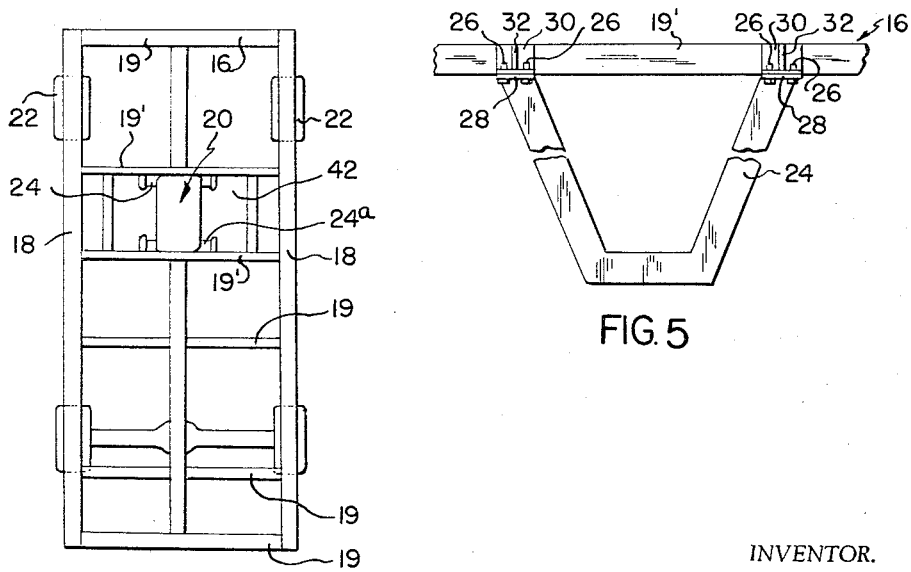
FIG. 4
FIG. 5
INVENTOR.
JOSEPH T. MYERS
BY
Baldwin, Doran & Egan
ATTORNEYS April 16, 1968  J. T. MYERS  3,378,094
MOTOR VEHICLE Filed Jan. 14, 1966  2 Sheets-Sheet 2

INVENTOR.
JOSEPH T. MYERS
BY
Baldwin, Doran & Egan
ATTORNEYS

United States Patent Office 3,378,094
Patented Apr. 16, 1968

3,378,094
MOTOR VEHICLE
Joseph T. Myers, Kent, Ohio, assignor to Highway Products, Inc., Kent, Ohio, a corporation of Ohio
Filed Jan. 14, 1966, Ser. No. 520,788
6 Claims. (Cl. 180—64)

ABSTRACT OF THE DISCLOSURE

A delivery type of vehicle has a floor mounted on a chassis which in turn is provided with front and rear sets of traction wheels. A front loading platform is provided forwardly of the front wheels for front end loading and unloading of the vehicle. The engine for driving the vehicle is supported rearwardly of the front wheels beneath the floor and an access opening is provided in the floor above the engine with a suitable cover therefor. This opening is of sufficient size to permit at least one workman to conveniently stand alongside the engine in the opening to work upon the engine.

---

This invention relates in general to motor vehicle construction, and more particularly to motor vehicle construction providing for ready accessibility to the power plant or engine thereof.

In prior art arrangements of motor vehicles, accessibility to the power plant or driving engine thereof is generally awkward or quite limited, resulting in cramped conditions for a workman or mechanic working on the vehicle engine. This results in increased maintenance costs and "downtime" for the vehicle.

The present invention provides a novel vehicle construction which includes a floor area having an access hatch or opening in the floor area, below which is located the vehicle engine, so that a workman can stand in the hatch or opening adjacent the engine, and can conveniently work on the engine.

Accordingly, an object of the invention is to provide a novel vehicle construction.

Another object of the invention is to provide a novel vehicle construction which includes a floor area and wherein an access opening or hatch is provided in such floor area, with the driving engine for the vehicle being disposed below the hatch, so that a workman can stand in the hatch adjacent the engine and conveniently work on the engine in the hatch area.

A further object of the invention is to provide a vehicle of the latter mentioned type wherein the chassis frame is of a construction which provides a clear area beneath the vehicle chassis in the vicinity of the access opening, for positioning of the driving engine of the vehicle, so that a mechanic can work on the vehicle engine without undue interference from the frame work of the chassis.

A further object of the invention is to provide a vehicle of the above-mentioned type wherein the engine is mounted in slung relation from the vehicle chassis, and in a manner that provides for convenient removal of the engine from the chassis, if the latter becomes necessary, for replacement or repair.

A still further object of the invention is to provide a novel vehicle construction wherein the chassis frame of the vehicle is of such construction that a clear area is provided beneath the frame, with the driving engine of the vehicle being suspended from the chassis frame in such clear area, and with there being provided a floor area on the chassis having an opening therein disposed above the vehicle engine, with a removable cover on the opening, so that upon removal of the cover from such access opening, a workman or a plurality of workmen, can stand directly on the ground adjacent the engine and extend through the access opening in the floor of the vehicle, and can conveniently work on the engine of the vehicle without interference from the chassis.

Other objects and advantages of the invention will be apparent from the following description taken in conjunction with the accompanying drawings, wherein—

FIGURE 1 is a generally perspective, diagrammatic, partially broken illustration of a vehicle in the form of a van, embodying the instant invention.

FIGURE 4 is a reduced size, diagrammatic plan view of the vehicle chassis.

FIGURE 5 is an enlarged, broken, elevational view of one of the hangers which is adapted for suspending the vehicle engine from the chassis.

Figure 2:
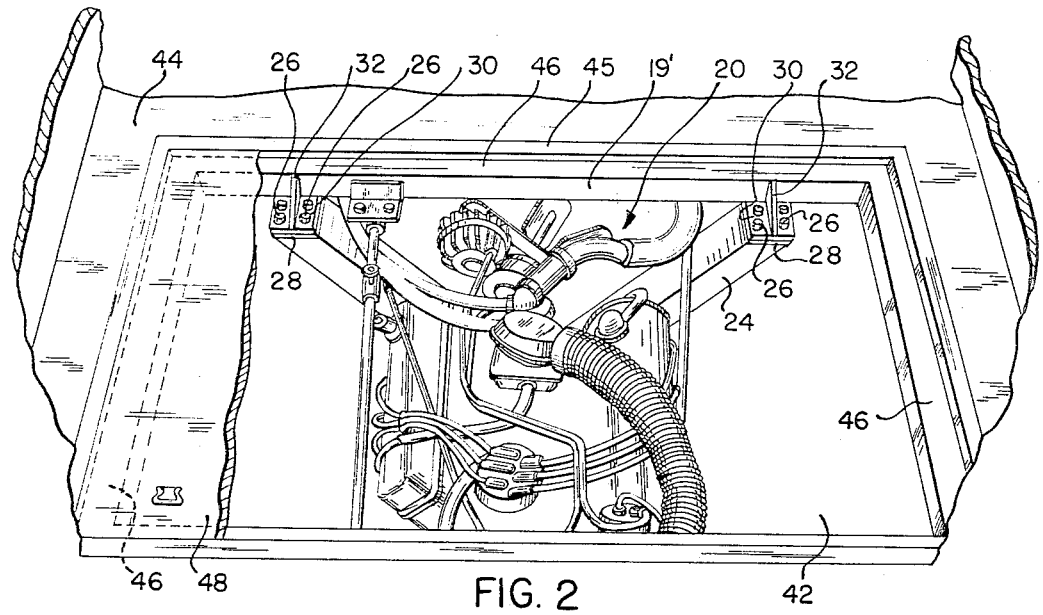
FIGURE 2 is a top generally perspective view of the interior of the vehicle of FIGURE 1, showing the access opening in the floor of the vehicle, with the cover having been removed from such opening, and illustrating the driving engine for the vehicle beneath the access opening.

Referring now again to the drawings, there is illustrated a motor vehicle of the van type having an enclosed body portion 10 and a cab portion 12, wherein the driver of the vehicle is adapted to sit for operating the same. The vehicle, in the embodiment illustrated, has a front loading and unloading platform section 13 which enables loading and unloading of the vehicle from either the front or side thereof. A door 14 may be provided in the vehicle body for providing ready accessibility to platform section 13 from the interior of the van body.

The vehicle chassis 16 may be of welded unitized construction comprising elongated laterally spaced side rails 18 (FIGURE 4) connected by cross rails 19, 19' which may be suitably coupled to the side rails as by welding.

Figure 3:
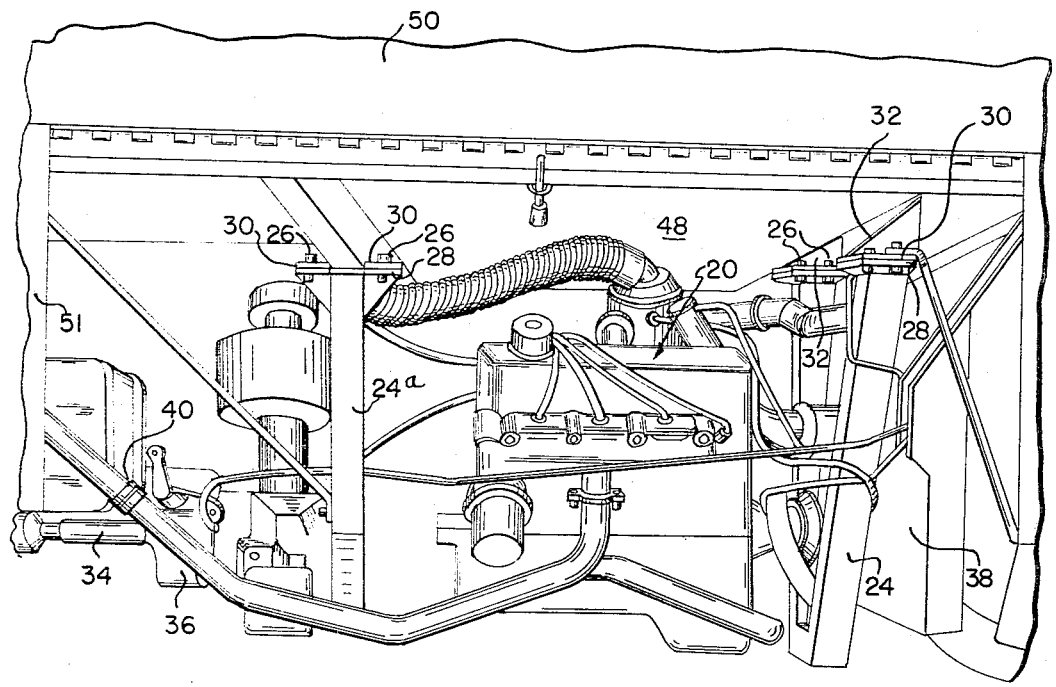
FIGURE 3 is an enlarged, fragmentary, elevational view of the vehicle of FIGURE 1 showing a side door in the skirt of the vehicle, which provides ready accessibility to the engine of the vehicle from the side of the latter, and illustrating the mounting of the vehicle's engine on the vehicle chassis below the access opening in the floor of the vehicle.

In the embodiment illustrated, the driving motor or engine 20 of the vehicle is located behind the front wheels 22, and as can be best seen in FIGURES 2 and 3 is suspended from the vehicle chassis as by means of generally U-shaped hanger members 24, 24a. Hanger members 24, 24a are preferably detachably coupled or slung from the chassis frame, as by means of bolt and nut assemblies 26 (FIGURES 2 and 5) so that such hanger members and supported motor 20 can be conveniently separated from the chassis frame and removed to some other location, in the event that replacement or major repair of the engine becomes necessary. Hanger members 24, 24a preferably embody flanges 28 at their upper ends which have suitable openings therethrough, through which extend the bolts of assemblies 26. Brackets 30 may be fixed to the associated cross members of the chassis frame for coaction with the flanges on the hanger members, to rigidly support the latter on the chassis frame. Brackets 30 may include strengthening webs 32, as best shown in FIGURE 2. It will be understood of course that if it becomes necessary to remove the engine 20 from the chassis frame, the drive shaft 34 has to be uncoupled from the engine transmission 36 (FIGURE 3) and the hose connections to the radiator 38 of the engine have to be unhooked, together with uncoupling of the exhaust pipe, as at 40.

In accordance with the present invention, an access opening 42 is provided in the floor 44 of the vehicle above the motor 20. In the embodiment illustrated, the access opening is of rectangular configuration and includes a defining framework 45 having downwardly recessed ledge portions 46, which are adapted to support a movable doorway or cover 48 for such opening. As can be best seen in FIGURE 4, such access opening extends longitudinally with respect to the vehicle between the cross rails 19' and transversely of the vehicle a sufficient width, and in the embodiment illustrated approximately two to three feet on either side of the engine, for enabling a workman to conveniently stand in the opening 42 adjacent the engine and work on the engine. Thus a mechanic can conveniently and efficiently work on the engine without being cramped for space, and without undue interference from the chassis. Such an arrangement reduces the maintenance costs on the vehicle engine, speeds up and facilitates the repairing thereof, and results in reduced "downtime" for the vehicle.

When the door or hatch 48 to the access opening is placed on the supporting ledge portions 46, the door is adapted to be substantially flush with the adjacent floor area 44 of the vehicle, and thus does not interfere in any manner whatsoever with stacking of merchandise on the storage floor of the vehicle.

There is also preferably provided doorway 50 (FIGURES 1 and 3) in the skirt portion 51 of the vehicle, and with such doorway being readily openable to permit further convenient access to the vehicle engine. A doorway 50 is preferably provided on both sides of the vehicle in the skirt portions thereof, so that such accessibility is possible from either side of the vehicle.

While the engine has been illustrated as being positioned directly behind the front wheels 22 of the vehicle, it will be understood that it could be positioned almost anywhere with respect to the vehicle floor, the main consideration being the provision of adequate space in the chassis frame adjacent at least one side of the engine, and preferably both sides thereof, so that an access opening can be provided above the engine for the purposes set forth.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What I claim is:

1. In a vehicle comprising a chassis having a floor area, an engine supported on said vehicle beneath said floor area, there being an access opening in said floor area above said engine, said access opening being of sufficient size to enable a workman to stand in the access opening for conveniently working on the engine, said chassis comprising longitudinally extending side rails and connecting generally transversely extending cross rails, hanger means depending from said cross rails, and said engine being supported on said hanger means in underslung relation with respect to said chassis.

2. A vehicle in accordance with claim 1, wherein said hanger means are detachably coupled to said chassis for convenient removal of said hanger means and supported engine from said chassis.

3. A vehicle in accordance with claim 1, wherein each of said hanger means is of generally U-shaped configuration having generally horizontal flanges at the upper ends thereof, for attachment to said cross rails of said chassis.

4. In a vehicle comprising a chassis, a floor mounted on said chassis, forward and rearward traction means mounting said chassis for movement along the ground, a front loading platform disposed forwardly of said forward traction means for front end loading and unloading of the vehicle, an engine mounted on said chassis and operatively coupled to at least certain of said traction means for driving the vehicle, said engine being disposed rearwardly of said front traction means beneath said floor, there being an access opening in said floor above said engine, a movable cover for said opening, and means around said opening supporting said cover thereon, said opening being of sufficient size to permit at least one workman to conveniently stand in said opening adjacent at least one side of said engine for working on the engine.

5. A vehicle in accordance with claim 4, wherein said cover, when in supported relation on said ledge means, is substantially flush with the upper surface of said floor.

6. A vehicle in accordance with claim 4, wherein said engine is located substantially centrally of said opening with the latter extending transversely to both sides of said engine a sufficient amount to permit at least one workman to stand on each side of said engine in said opening with his feet on a surface supporting said traction means and with the upper portion of his body extending above said floor.

References Cited

UNITED STATES PATENTS 2,328,313 8/1943 Von Ohlsen _____ 105—133
2,710,158 6/1955 Cushman _____ 248—9
2,855,064 10/1958 McCullough _____ 180—64 X
2,857,977 10/1958 Bock _____ 180—89

LEO FRIAGLIA, *Primary Examiner.*

MILTON L. SMITH, *Examiner.*